May 30, 1933.    C. H. TOMLINSON    1,911,252
ELECTRIC CIRCUIT FOR TROLLEY CARS
Filed April 16, 1931
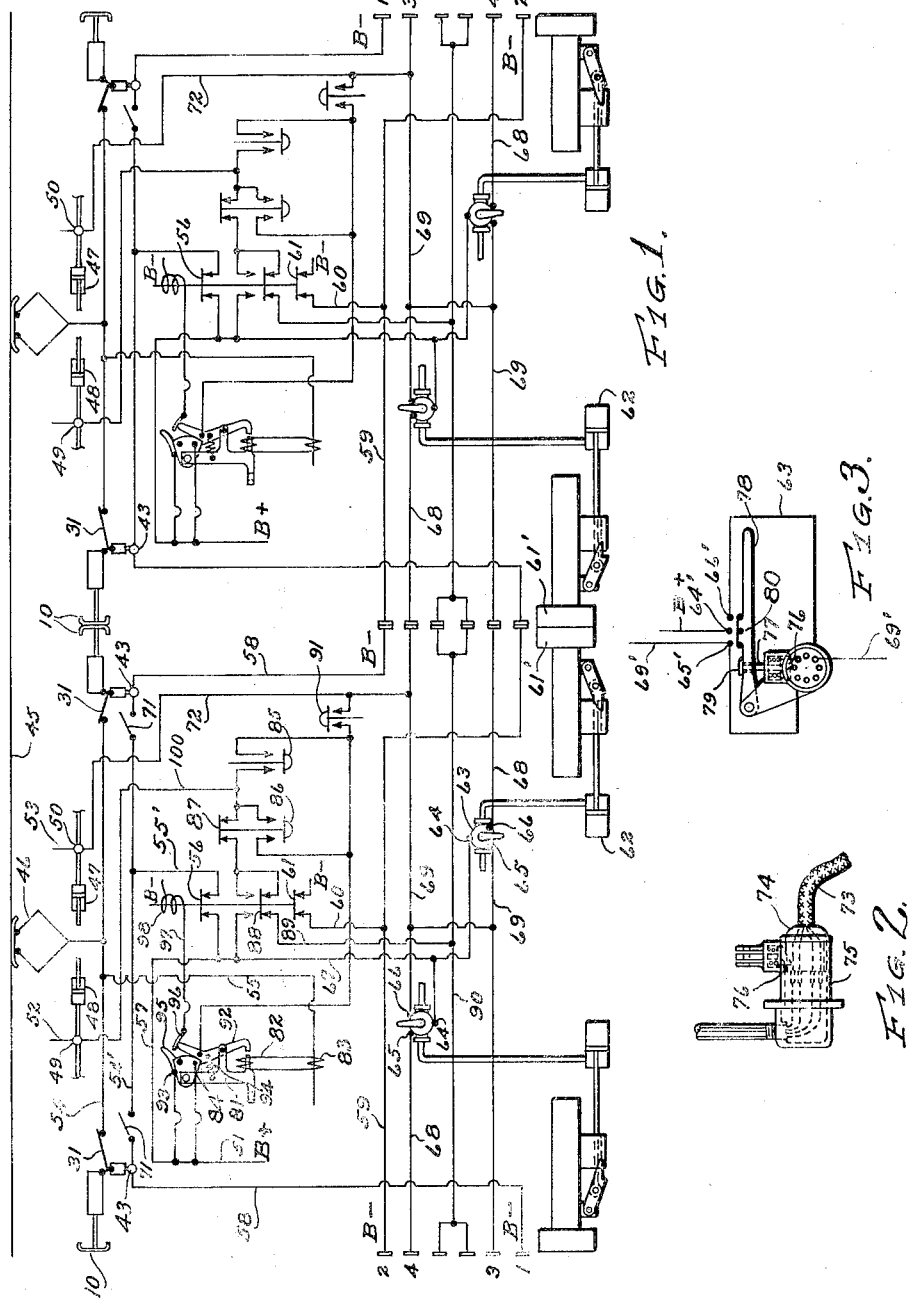
Inventor
CHARLES H. TOMLINSON
By
Attorney Patented May 30, 1933

1,911,252

UNITED STATES PATENT OFFICE

CHARLES H. TOMLINSON, OF MANSFIELD, OHIO, ASSIGNOR TO THE TOMLINSON COUPLER COMPANY, OF MANSFIELD, OHIO, A CORPORATION OF OHIO

ELECTRIC CIRCUIT FOR TROLLEY CARS

Application filed April 16, 1931. Serial No. 530,493.

This invention relates to electric circuits for trolley cars and has for one of its objects the provision of an improved bus line connector for joining the bus lines of adjacent cars in a train.

A further object is to provide an overhead bus line connector having a cut-out switch and control circuit therefor by which the contact member of the bus line connector can be de-energized when the car end is not connected to another car or when the electric circuit of the car is disabled.

A further object is to provide means for preventing damage resulting from operation of the bus line connector and cut-out switch so as to dispense with reliance from the human element as far as possible in avoiding damage resulting from the operation of these parts.

A further object is to provide jumper plugs for connecting the electric circuits of adjacent cars in a train with means for preventing damage resulting from operation of these plugs.

A further object is to provide means for preventing interruption of the bus line circuit between two cars except when the bus line circuits of both cars are connected with the trolley wire, whether the connection between the bus line circuits of the two cars is by means of the overhead bus line connector or by means of jumper plugs.

A further object is to provide means for preventing opening of the supply circuit on a car when abnormal current is flowing in the circuit either from overload or from ground.

A further object is to provide means for immediately disconnecting the bus line circuit of a car from the supply conductor and for de-energizing the bus line connector contacts of that car and the cooperating contacts of the adjacent cars whenever the supply current is cut off after abnormal rush of current to the car.

A further object is to provide an electrical system for trolley cars which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is a wiring diagram of the electrical circuit of two coupled cars.

Fig. 2 is a side elevation and Fig. 3 an end elevation of a connector plug for a jumper cable for connecting the electric circuits of adjacent cars.

Fig. 1 shows a wiring diagram for the electric circuits of two coupled cars and since the circuits for the two cars are alike, it will only be necessary to explain the connections and operation for one of the cars and the relation of the circuits of the two cars. 45 designates an overhead trolley wire from which current is collected by means of a pantograph 46. It will be understood, of course, that current could be supplied by means of a third rail or any other suitable electrical connection. The arrangement is designed for a relatively high voltage; the construction shown being intended for 11,000 volts but, of course the invention is not restricted to any particular voltage. The pantograph 46 is provided with the usual means for raising and lowering, the raising cylinder being shown at 47 and the lowering cylinder being shown at 48. In the usual construction the pantograph is pulled down by means of the cylinder 48 and is locked in its lowered position. An electropneumatic valve 49 controls the admission of air to the cylinder 48 and a similar valve 50 controls the admission of air to the cylinder 47. The pantograph lock is released when air is admitted to cylinder 47 and the pantograph is raised by means of a spring. The current for operating the valves 49 and 50 may be supplied from a battery, thirty-two volts being common for this purpose. The connection to the positive terminal of the battery is shown at 51, it being understood that the conductors 52 and 53 are permanently connected to the negative or grounded side of the battery. The pantograph is connected to a bus line conductor 54 which is provided with a lead 55 extending to a step-down transformer within the car by means of which the voltage is transformed to a suitable voltage for operating the driving motors and other electrically energized apparatus within the car.

The ends of the bus line 54 are connected to the bus line contacts previously described; the contact members being shown at 10 with their disconnecting switches 31 and electropneumatic valves 43 for controlling the switches. Electropneumatic valves 43 are connected through leads 54' and 55', a relay switch 56 and a lead 57 to the battery plus connection 51. The connection to the negative terminal of the battery for each of the valves 43 is made in the adjacent coupled car through leads 58, 59, 60 and relay switch 61. It will thus be seen that it is only when one car is coupled to another car in a train that the electropneumatic valve 43 can be energized to close the switch 31 and energize the corresponding contact 10. If one end of the car is not connected to another car, as shown at the left in Fig. 5, the negative lead 58 will be open and the corresponding electropneumatic valve 43 will be de-energized and the switch 31 will be held open by the spring 38, so that the contact 10 on an uncoupled end of a car is always dead.

It frequently happens that current is supplied to several cars in a train from a pantograph on a single car so that heavy current at high voltage passes through the bus line connectors 10. If cars are uncoupled and the bus line connectors separated while current is thus flowing, dangerous arcing will take place or if the switches 31 are opened under these conditions, dangerous arcs will be formed. There is no means provided, therefore, for de-energizing the electropneumatic valves 43 except by separating the cars or by operation of the relay switch 56. As will be explained later, the switch 56 is only operated when the current is cut off from the trolley wire 45 by the breaker switch in the power station.

It is true that emergency switches 71 may be provided in the lead 54 but these switches are normally sealed in their closed position and are only opened in case of an emergency. The leads 58 are connected to the negative terminal of the batteries in the adjacent cars through relay switches 61 controlled by the same relays which operate the switches 56 and which are actuated only in cases when the power is cut off from the trolley wire. By this arrangement, the switches 31 are kept closed at all times except when the power is shut off from the trolley wire after operation of the overload relay in the car or when the cars are separated or when a car is disabled and placed out of service, as will be explained later. This prevents opening of the switches 31 when current is flowing through the contactors 10.

In order to prevent arcing at the contactors 10 when the cars are separated, means is provided for automatically energizing the pantograph up cylinders 47 in each of two connected cars before the cars can be separated or uncoupled. When this is done the trolley wire 45 forms a shunt or parallel circuit with the bus line connectors 10 so that when the bus line connectors are separated, no arcing will occur. The mechanical couplers are shown at 61' and each is provided with an uncoupling cylinder 62 which is controlled by an uncoupling valve 63. The uncoupling valve 63 is provided with switch mechanism having three terminals 64, 65 and 66. The terminal 64 is connected through leads 67 and 57 to the battery plus connection 51. The terminals 64, 65 and 66 are insulated from one another but are all connected together when the valve 63 is operated to uncouple the cars. The terminal 66 is connected to a lead 68 extending to the end of the car controlled by the valve 63, and the terminal 65 is connected to a lead 69 extending to the opposite end of the car. The two leads 69 are connected together and to a lead 72 connected to the electropneumatic valve 50 for energizing the pantograph up cylinder 47.

When the valve 63 is operated to open the coupler at one end of the car, the conductors 69 in the cars being uncoupled will be connected to battery through the terminal 64 so that current will flow through the leads 72 in the two cars being uncoupled to the valves 50 controlling the pantograph up cylinders 47 in the two cars, so that the pantographs will be raised in both cars before the cars can be separated, thus avoiding arcing at the contactors 10 when the cars are moved apart. The electrical coupler contacts are shown in plan in the diagrams and the terminals for the conductors 68 and 69 are reversed in the opposite ends of a car so that when two cars are coupled a terminal for the conductor 68 will always engage the terminal 69 in the coupled car. This will confine the effect of the operation of the valve 63 to the car in which the valve is located and the next adjacent car, since the circuits to the remaining portions of the train will be interrupted by the contacts on the valves 63 which are not moved to the position for uncoupling. It will be understood, of course, that the same arrangement may be used for operating both pantographs on a car when the car is supplied with two instead of one pantograph.

In case jumpers are used for connecting the electric circuits of adjacent cars, the same effect can be secured as is described above by the jumper connection shown in Figs. 2 and 3. In this case the jumper 73 is provided with a plug 74 arranged to be inserted in a socket 75 and held in place by a spring pressed latch 76.

The latch 76 is provided with a stem 77 passing freely through an operating lever 78 but having a head 79 at its upper end by means of which the latch 76 is withdrawn when the lever 78 is lifted. Contacts 64', 65' and 66', corresponding to contacts 64, 65 and 66 in Fig. 5, are arranged in position to be connected by a contact member 80 carried by the lever 78. It will thus be seen that when the lever 78 is raised to release the jumper plug 74, the contacts 64', 65' and 66' will be connected and the circuit 69' in the adjacent cars will be energized to raise the pantographs in the cars which are to be separated by removing the jumper 73. Thus the jumper circuit will be shunted by the trolley prior to the separation of the jumper contacts.

Heretofore, much inconvenience has been caused whenever a short has occurred in the supply circuit of a trolley car having a high voltage supply. It has been impractical to provide an overload cut-out on the trolley car itself sufficient to interrupt the heavy current drawn by one or more cars at the high voltage at which it is supplied. If, for instance, a ground should occur on the primary of the transformer, the current is interrupted by the breaker in the power station. These breakers are so arranged that they will open for a few seconds and reclose, after which if the ground is still on the circuit, they will reopen and remain open. The few seconds that the circuit remains open primarily is insufficient time for the train operator to ascertain which car is affected and to pull down his pantograph or open his bus line connectors so that the cut-out switch at the power station is permanently opened before the disabled car can be disconnected. When the power has thus been cut off, the train operator may locate the trouble and disconnect the car but it is then necessary for him to get word to the power station before the operator at the station will re-close the switch. He may have to walk some distance to a telephone in order to communicate with the power office, and it is not infrequent that a disabled car will tie up the whole line from several minutes to a half hour or more.

The present invention avoids all this difficulty and delay by providing means for de-energizing the bus line connectors on the disabled car and on the adjacent ends of the two connected cars and for lowering the pantograph, all within the few seconds that the station breaker is originally opened, so that when the breaker again closes the disabled car will be entirely out of the circuit and the breaker will remain closed and operation will continue without interruption.

Each car is provided with a relay shown at 81 having a magnetic winding 82 energized by a current transformer 83 which, in turn, is energized by the high potential lead 55 connected to the bus line connector 54. The relay 81 is provided with contacts 84 which are normally closed and which control the circuit from the plus battery to the switches 85 and 86 by means of which the pantographs are lowered by the train operator. The switch 85 controls current to the lead 100 connected to the electropneumatic valve 49 controlling the pantograph down cylinder 48. Normally when the switch 85 is closed, current will be supplied not only to the pantograph down cylinder in the same car but will also flow through switches 87 and 88 and lead 89 to conductor 90 extending through the train, so that all of the pantographs in the train will be lowered. If the switch 86 is closed, however, the switch 87 will be simultaneously opened so that the pantograph in the car in which the switch is located will be lowered but not the other pantographs in the train.

If an overload or a short circuit occurs on the high potential line 55, the relay 81 will be operated opening the contacts 84 thus cutting off battery from the pantograph down switches, making it impossible for the trainman to lower his pantographs while the abnormal current is flowing through the pantograph. If it were possible to lower the pantograph under these conditions, destructive arcing would occur because of the high voltage and heavy current flowing. The contacts 84 also control the supply of current to the pantograph up switch 91 so that when the relay 84 is being held open by abnormal current in the high potential winding, it is impossible to raise the pantograph if the pantograph should be down. As soon as the lever arm 92 of the relay 81 is operated, the segment member 93 drops downwardly, moving the contact 84 out of registration so that after the current has been cut off from the line 55 by the breaker in the power house, the lever 92 will be returned to its normal position by the spring 94 but the contacts 84 will not re-engage, thus making it impossible for the trainman to raise his pantograph after a short or ground has occurred on the car. The relay 81 is so enclosed that it cannot be reset until it is taken to the shop.

When the segment 93 drops downwardly, the contact member 95 is brought into registration with a contact member 96 and as soon as the winding 82 is de-energized and the lever 92 is returned by the spring 94, the contacts 95 and 96 will engage, thus energizing the lead 97 to the relay coil 98 controlling the switches 56, 88 and 61. As soon as the breaker in the power house opens primarily, the lever arm 92 will be returned and the relay coil 98 will be energized, thus opening the switch 56 and cutting off current from the electropneumatic valves 43 so that the switches 31 will immediately open. The lower contacts of switch 88 will also be opened and the upper contacts will be closed so that current will flow through the switch 87 and lead 100 to the electropneumatic valve 49 controlling the pantograph down cylinder 48. Thus, in the interval while the breaker is open in the station, the pantograph on the disabled car will be lowered. During this interval not only will the switches 31 on the disabled car be opened but the switches 31 on the adjacent ends of the two connected cars will also be opened. This will be accomplished by opening the circuit 61 which supplies the negative battery connection for the electropneumatic valves 43 in the adjacent ends of the two coupled cars. Thus, when a short or an overload occurs, the car affected is immediately disconnected from the trolley wire and from the two adjacent cars and is entirely cut out of the electrical system, so that operation of the train may continue without interruption and without any attention on the part of the trainman. At the end of the run or whenever convenient, the disabled car may be taken into the barns, the ground removed and the relay 81 reset into its normal operating position.

I claim:

1. The combination with two cars in a train, of a conductor for supplying electrical current to said cars, a collector on each car for engaging said conductor, and an electric circuit extending from car to car and connected with said collectors, and automatically operable means for connecting the collectors on both cars with the supply conductor before the circuit from car to car can be opened.

2. The combination with two coupled cars, of a conductor for supplying electrical energy to said cars, a collector on each car movable into and out of engagement with said conductor, a circuit extending from car to car to permit either car to be supplied with electricity from the collector of the other car, and means for preventing interruption of said circuit except when the collectors on both cars are in contact with said supply conductor.

3. The combination with cars arranged to be coupled in a train, of a conductor for supplying electricity to said cars, a collector on each car for engaging said conductor, a bus line circuit extending from car to car and connected with said collectors, means for opening said bus line circuit from car to car, a device for controlling the opening of said bus line circuit and means controlled by said device for connecting the collectors in both cars with said supply conductor prior to the opening of said bus line circuit whenever said device is operated to cause the opening of said circuit.

4. The combination with coupled cars, of a conductor for supplying electrical energy to said cars, a collector on each car for engaging said supply conductor, a bus line circuit connected with said collectors and extending from car to car, said bus line circuit being opened when said cars are separated, a device for controlling the separation of said cars, and means controlled by said device for moving said collectors into engagement with said supply conductor prior to the separation of said cars whenever said device is operated to cause separation of said cars.

5. The combination with a car, of a bus line circuit in said car, a switch in said circuit and a control circuit for said switch having connection with a circuit in a coupled car and adapted to be energized only when connected with said coupled car.

6. The combination with a car, of a bus line for said car, a bus line connector for connecting said bus line with a bus line of a coupled car, a switch connecting said bus line with said bus line connector, means for opening said switch, and a circuit for controlling said opening means, said circuit having one terminal thereof in the car in which said switch is located and the other terminal thereof in the coupled car so that said circuit cannot be energized when said car is uncoupled.

7. The combination with a car, of a bus line circuit extending through said car, a bus line connector at each end of said car for connecting said bus line circuit with bus line circuits of connected cars, switches connecting the bus line with the connectors at the ends of the car, electropneumatic valves for controlling said switches and circuits for energizing said electropneumatic valves, said circuits having one terminal thereof in said car and the other terminals in the respective coupled cars.

8. The combination with cars in a train, of a bus line extending through said train, bus line connectors at each end of each car for connecting the bus lines of adjacent cars, switches connecting the respective connectors with said bus line, electric circuits for controlling said switches, the circuit for controlling the switch at each end of each car having one terminal thereof in the car in which the switch is located and the other terminal thereof in the adjacent coupled car so that when two cars are uncoupled the circuits controlling the switches at the uncoupled ends of the car will be broken and the switches opened, de-energizing the connectors at the uncoupled ends of the cars.

9. The combination with a car, of a conductor for supplying current to the car, a collector for transmitting current from said conductor to said car, an overload relay in circuit with said collector, a bus line connected with said collector, a bus line connector for connecting said bus line with a bus line of a coupler car, a switch for connecting said bus line with said bus line connector, and means controlled by said overload relay for opening said switch and for withdrawing said collector from said supply conductor immediately after a flow of current, sufficient to operate said overload relay, has ceased.

10. The combination with a car, of a conductor for supplying current to said car, a collector for transmitting current from said conductor to said car, a bus line on said car, bus line connectors for connecting opposite ends of said bus line to coupled cars, switches electrically connecting said bus line with said bus line connectors, means for opening said switches, an electric circuit for controlling said opening means, means for withdrawing said collectors from said conductor, an electric circuit for controlling said withdrawing means, an overload relay for controlling said circuits, said relay being arranged to energize said circuits after said relay has been operated by a flow of overload current and immediately after said flow of overload current has ceased.

11. The combination with a car having a collector for collecting current from a supply conductor, a bus line in said car, bus line connectors for connecting said bus line with the bus lines of coupled cars, and means for disconnecting said bus line connectors from said bus line and for disconnecting the bus line connectors on the adjacent ends of coupled cars and for retracting said collector after an overload current has been transmitted to said car by said collector and immediately after but not until the flow of overload current has ceased.

12. The combination with electric cars in a train, of current collectors for each car, a bus line extending through the train, a bus line connector at each end of each car for engaging the bus line connector of the adjacent end of a coupled car, and means rendered operative by an overload flow of current in any car and caused to operate immediately after the overload flow has ceased for withdrawing the current collector in that car and for de-energizing the bus line connectors in that car and in the adjacent ends of coupled cars.

13. The combination with a plurality of coupled cars in a train, of a conductor for supplying current to said cars, a current collector on each car for engaging said conductor, a bus line extending through said train and connected to said collectors, bus line connectors at the ends of the cars for connecting the bus line from car to car, switches connecting the bus line with the respective bus line connectors, means for withdrawing said collectors from said conductor, an overload relay, means controlled by said overload relay for disabling said withdrawing means during the flow of overload current through said relay, and means controlled by said overload relay and operated immediately after the flow of overload current in said relay has ceased for opening said switches to de-energize the bus line connectors at both ends of the car in which the overload current occurred and in adjacent ends of coupled cars and for energizing the withdrawing means for the current collector on the car in which the overload current occurred and withdrawing said collector from the supply conductor.

In testimony whereof I have signed my name to this specification this 4th day of April A. D. 1931.

CHARLES H. TOMLINSON.